US 6,693,151 B2

(12) United States Patent
Throne et al.

(10) Patent No.: US 6,693,151 B2
(45) Date of Patent: Feb. 17, 2004

(54) SEMI-CONTINUOUS BIMODAL EMULSION POLYMERIZATION

(75) Inventors: Thomas George Throne, Hatboro, PA (US); Owen Clifford Hallerud, Mt. Laurel, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 75 days.

(21) Appl. No.: 10/165,891

(22) Filed: Jun. 10, 2002

(65) Prior Publication Data

US 2002/0193548 A1 Dec. 19, 2002

Related U.S. Application Data

(60) Provisional application No. 60/298,140, filed on Jun. 14, 2001.

(51) Int. Cl.$^7$ .................................................. C08F 2/24
(52) U.S. Cl. ............................. 526/65; 526/67; 526/68; 526/78; 526/79; 526/80; 526/81; 526/87; 526/88; 526/201

(58) Field of Search ................ 526/79, 78, 80, 526/81, 87, 201, 65, 68, 67, 88

(56) References Cited

U.S. PATENT DOCUMENTS

| 4,022,744 A | | 5/1977 | D'Achille et al. |
| 4,219,454 A | | 8/1980 | Iacoviello et al. |
| 4,254,004 A | * | 3/1981 | Abbey ........................ 523/221 |
| 4,628,071 A | | 12/1986 | Morgan |
| 4,946,891 A | * | 8/1990 | Devona et al. ............. 524/833 |
| 5,430,092 A | * | 7/1995 | Aydin et al. ................ 524/458 |
| 5,444,140 A | | 8/1995 | Paine et al. |
| 5,498,655 A | * | 3/1996 | Aydin et al. ................ 524/458 |

* cited by examiner

*Primary Examiner*—Kelechi C. Egwim

(57) ABSTRACT

An aqueous semi-continuous emulsion polymerization process for producing bimodal polymer particles in volumes large than a single batch size is provided. A bimodal polymer composition prepared by the process of carrying out an aqueous semi-continuous emulsion polymerization is also provided.

4 Claims, No Drawings

SEMI-CONTINUOUS BIMODAL EMULSION POLYMERIZATION

CROSS REFERENCE TO RELATED PATENT APPLICATIONS

This is a non-provisional application of prior pending U.S. provisional application serial No. 60/298,140, filed Jun. 14, 2001.

This invention pertains to a method for semi-continuous emulsion polymerization, which produces a bimodal product in volumes greater than that of a single reactor, and which requires a minimum investment of additional equipment.

A bimodal polymer is a polymer wherein at least 90 percent of the polymer is present in two populations of particle mode, wherein each mode has a different particle size. The second mode creates a packing phenomena wherein the smaller mode fills the gaps between the larger mode, thus resulting in a polymer containing significantly higher solids than a unimodal polymer. Several patents describe the manufacture of bimodal polymers by various routes. However, because of the need to grow the second particle mode in the presence of an initial, or first mode, it has been generally accepted that the second particle mode must be grown in its entirety in the presence of the first mode, using a multi-step process. U.S. Pat. No. 4,254,004 discloses a two-step latex polymerization of ethylenically saturated monomer wherein the monomer feed rate exceeds the monomer polymerization rate in the first step until the Trommsdorff exotherm occurs, followed in the second step wherein the monomer feed rate is slower than the monomer polymerization rate to produce in-situ bimodal latex polymer particles. This process produces only a single reactor volume per batch.

In recent years, it has been discovered that unimodal emulsion polymerization can be carried out using a semi-continuous process. U.S. Pat. No. 4,946,891 discloses an aqueous copolymerization carried out on a semi-continuous basis using a single continuously stirred tank reactor in which, as is conventional, the materials being copolymerized (monomers) and the materials used in the copolymerization are supplied slowly to a reactor while maintaining conditions causing copolymerization to proceed until the total supply is in the range of from about 1.5 to about 5 reactor volumes. As materials are added to the reactor, a corresponding amount of the reactor contents spills out of the reactor into one or more vessels in which the copolymerization reaction is completed. This process produces only a unimodal polymerization product.

The problem addressed by the invention is the provision of a process for semi-continuous emulsion polymerization, which produces a bimodal product in volumes greater than that of a single reactor, and which requires a minimum investment of additional equipment.

In a first aspect of the invention there is provided a method of producing a bimodal polymer product, by semi-continuous, aqueous polymerization, composed of supplying to a single continuously stirred tank reactor, materials used in the polymerization, including water, and at least one ethylenically unsaturated monomer; creating in the reactor, conditions causing polymerization of a first polymer mode to proceed; adding a surfactant or an emulsion polymer having a diameter different from that of the particles in the first mode at that point in the reaction, to initiate growth of a second polymer mode; continuing the supply, under the conditions, producing a bimodal polymer product; continuing the supply to the reactor, while simultaneously removing part of the bimodal polymer product from the reactor; collecting the removed bimodal polymer product in at least one separate vessel, continuing the supply, and maintaining the conditions until the total supply is at least 1.05 reactor volumes and less than to 2 reactor volumes; completing the polymerization reaction in the separate vessel; and combining together all of the bimodal polymer product.

In a second aspect of the invention there is provided a bimodal composition, prepared by semi-continuous, aqueous polymerization composed of supplying to a single continuously stirred tank reactor, materials used in the polymerization, including water, and at least one ethylenically unsaturated monomer; creating in the reactor, conditions causing polymerization of a first polymer mode to proceed; adding a surfactant or an emulsion polymer having a diameter different from that of the particles in the first mode at that point in the reaction, to initiate growth of a second polymer mode; continuing the supply, under the conditions, producing a bimodal polymer product; continuing the supply to the reactor, while simultaneously removing part of the bimodal polymer product from the reactor; collecting the removed bimodal polymer product in at least one separate vessel, continuing the supply, and maintaining the conditions until the total supply is at least 1.05 reactor volumes and less than to 2 reactor volumes; completing the polymerization reaction in the separate vessel; and combining together all of the bimodal polymer product.

The process in this invention produces bimodal polymer particles. The bimodal product is made up of a mixture of polymer particles of two size distributions, wherein the diameter of the larger particles may be 3.5 to 30 times the diameter of the smaller distribution particles, and preferably 5 to 15 times larger than the smaller particles, as measured by weight average particle size.

The semi-continuous aqueous polymerization process is carried out by first supplying to a single continuously stirred tank reactor the materials used in the polymerization. These materials include water, and at least one ethylenically unsaturated monomer, and may include an emulsifier, catalyst and/or a polymer seed. By semi-continuous, herein is meant some of the reactants are charged to the reactor at the beginning of processing, and the remaining reactants are fed continuously as the reaction progresses while some of the product is simultaneously withdrawn from the reactor. By continuously stirred, herein is meant the reactants are agitated during processing, providing mixing and creating a substantially uniform composition within the reactor. By tank reactor, herein is meant a vessel with inlet and outlet pipes, equipped with some means of agitation and provisions for heat transfer (for example jacket, external or internal heat exchangers), and which can accommodate either batch or continuous operations over wide ranges of temperatures or pressures. By polymer seed, herein is meant, a polymer composition whose particle size predefines the diameter of the first polymer mode of the bimodal product. This invention contemplates that the addition of water and monomer to the reactor may include the addition of the water followed by neat monomer, or the addition of water followed by a monomer emulsion, or the addition of a mixture of water and a small amount of monomer followed by the addition of a monomer emulsion.

At least one ethylenically unsaturated monomer may be selected from amides such as (meth)acrylamide, propenamide, dimethylacrylamide; esters such as methyl acrylate, ethyl acrylate, butyl acrylate, propyl acrylate, 2-ethylhexyl acrylate, hydroxyethyl acrylate, methyl methacrylate, hydroxyethyl methacrylate, hydroxymethyl acrylate, hydroxymethyl methacrylate, hydroxypropyl acrylate, hydroxypropyl methacrylate, allyl methacrylate, diallyl phthalate, 1,3-butylene glycol dimethacrylate, 1,6-hexanedioldiacrylate, vinyl acetate, vinyl proprionate, or other vinyl esters; nitriles such as acrylonitrile; and the like, and combinations of the foregoing. Other suitable ethylenically unsaturated monomers may include vinyl monomers such as vinyl chloride, vinylidine chloride, vinyl acetate and N-vinyl pyrollidone, divinyl benzene; styrene or alkyl-substituted styrene, butadiene; and the like, and combinations of the foregoing. Examples of ethylenically unsaturated carboxylic acid monomers that are useful in this invention include acrylic acid, methacrylic acid, fumaric acid, crotonic acid, maleic acid, itaconic acid, and combinations of two or more such acids. Preferably, the ethylenically unsaturated carboxylic acid is acrylic acid. Preferably, a stabilizing monomer, such as an acid containing monomer is used to stabilize the emulsion polymer. Examples of specific stabilizing monomers include the monomers listed above as examples of ethylenically unsaturated carboxylic acid monomers.

Catalysts which may be used to cause free radical polymerization of the above monomers include, a thermal initiator, or a redox initiator system composed of an oxidizing agent and a reducing agent. Examples of suitable oxidizing agents include ammonium persulfate, alkali metal persulfates; perborates; peracetates; percarbonates; peroxides, for example hydrogen peroxide, cumene hydroperoxide, dibenzoyl peroxide, diacetyl peroxide, dodecanoyl peroxide, di-t-butyl peroxide, dilauroyl peroxide, bis(p-methoxy benzoyl) peroxide, t-butyl peroxy pivilate, and dicumyl peroxide; isopropyl percarbonate; di-sec-butyl peroxidicarbonate, and the like, and mixtures thereof. Examples of suitable reducing agents include alkali metal and ammonium salts of sulfur-containing acids such as sodium sulfite, bisulfite, metabisufite, thiosulfite, sulfide, hydrosulfide, or dithionite; sulfinic acids, such as alkyl-sulfinic acids, aryl sulfinic acids, and hydroxyalkyl sulfinic acids, and 2-hydroxy-2-sulfinatoacetic acid; amines such as ethanolamine; glycolic acid; glyoxylic acid hydrate; ascorbic acid; isoascorbic acid; lactic acid; glyceric acid; malic acid; tartaric acid and salts of the preceding acids, salts of the preceding acids, and the like, and mixtures thereof. Thermal initiators can be used which decompose or become active at the polymerization temperature. Examples of suitable thermal initiators include those compounds listed above as oxidizing agents.

Emulsifiers which are typically used may be any anionic, nonionic, or cationic surfactant, soap, or the like, which are well known in the art, and stable at the pH of the bimodal latex. Examples of specific emulsifiers include alkyl sulfates, alkyl sulfosuccinates, alkyl aryl sulfonates, α-olefin sulfonates, quaternary ammonium salts, amine salts, fatty or resin acid salts, nonyl or octyl phenol reaction products of ethylene oxide and the like. Examples of specific surfactants include sodium lauryl sulfate, sodium sulfosuccinates such as sodium dimethylamyl sulfosuccinate, sodium dodecyl diphenyloxide disulfonate and the like. The amount of emulsifier present is sufficient to obtain an aqueous emulsion of the monomers.

Optional chain transfer agents include mercaptans such as the alkyl and/or aralkyl mercaptans. Examples of specific chain transfer agents include n-octyl mercaptan, n-dodecyl mercaptan, t-octyl mercaptan, t-dodecyl mercaptan, tridecyl mercaptan, tetradecyl mercaptan, hexadecyl mercaptan and the like, as well as mixtures thereof.

Conditions are created in the reactor which cause polymerization of a first polymer mode to proceed. The reactor is usually initially heated to establish the desired reaction temperature for production of a first polymer mode. The reaction temperature may range from 30° C. to 150° C., preferably from 60° C. to 95° C. Cooling may be utilized. After 5 to 95 percent, preferably 15 to 60 percent, of the reactor feeds have been charged to the reactor, a surfactant, or an emulsion polymer is added to the reactor to initiate the growth of a second polymer mode. The surfactant may be selected from the compounds listed above as examples of emulsifiers. If an emulsion polymer is used to initiate the growth of the second mode, it must have a diameter which differs from that of the particles in the first mode at that point in the reaction. The supply of materials used in the bimodal polymerization is continued under the above-mentioned conditions. Additional catalyst may be added to the reactor. The rate of the reaction is determined by the type of catalysts that are selected, and the reaction temperature.

In one embodiment of the invention, the supply of materials used in the bimodal polymerization is continued, while the bimodal product is simultaneously, continuously or not, removed from the reactor. Removal of the bimodal product may begin as soon as the second mode initiating surfactant or emulsion polymer has been added, preferably when the reaction mixture takes up 90 to 99 percent of the reactor capacity, and most preferably when the reactor is full. By full, herein is meant the maximum operating volume recommended by the reactor manufacturer. The bimodal product is removed from the reactor, at a rate at least as fast as the rate of the reactor feeds.

In another embodiment of the invention, the supply of materials used in the bimodal polymerization is continued until the reactor is full, at which time, the reactor feeds are stopped. A portion of the reactor mixture is removed from the reactor and transferred to a separate vessel. After the transfer is complete, the feeds to the reactor are resumed.

The supply to the reactor of materials used in the bimodal polymerization is stopped when the total supply is at least 1.05 reactor volumes and less than 2 reactor volumes, preferably at least 1.2 and less than 1.9 reactor volumes, and most preferably at least 1.4 and less than 1.8 reactor volumes. Processing of more than 2 reactor volumes using this invention may result in an increased number of polymer modes. The total bimodal product is transferred to at least one separate vessel.

The polymerization reaction is completed in the separate vessel(s). By completed herein is meant that the polymerization is continued until the residual monomer has reached a desired level of conversion, such as at least 95%, preferably at least 98%, most preferably at least 99.5% of the monomer has been converted to polymer, and the ratio of solids to water is 70:30 to 20:80. By solids, herein is meant, a composition including polymer, and solid fragments from surfactant, catalyst, activator or any other nonvolatile materials used in the polymerization reaction. By separate vessel, herein is meant a container that provides the capability to feed additional materials to the bimodal product. All of the bimodal product is combined together. Provision should be made to ensure the uniform distribution of the bimodal particles, whether by mixing, during transportation, or by other means. It is also contemplated that functional additives may be added to the bimodal product. By functional additives, herein is meant biocides, defoamers, thickeners, and the like.

In one embodiment of this invention, the emulsion polymerization product may be a multimodal polymer product with three or more particle size modes.

The bimodal emulsion polymer of this invention is especially useful in aqueous latex paints. In addition to paints, the bimodal polymer particles of this invention are useful for providing improved physical properties in paper coatings, leather coatings, plastics, adhesives, roofing materials, nonwoven and paper saturants, and the like.

The following examples are presented to illustrate the invention and the results obtained.

EXAMPLE 1

A 5 liter pyrex stirred tank reactor was set up with a variable speed agitator and an overflow tube to allow gradual removal of material from the reactor during polymerization. A pinch valve was used on the tube to regulate the rate of material removal from the reactor.

A monomer pre-emulsion (Item A) was prepared by mixing 380 gms of Deionized (DI) water, 28.0 gms of sodium dodecyl benzene sulfonate surfactant, 1313 gms of butyl acrylate, 1189 gms of methyl methacrylate and 33.2 gms of acrylic acid. Constant mixing was used during makeup to give a uniform emulsion. Total weight was 2943 gms.

A first initiator solution (solution B) was prepared by mixing 3.5 gms of ammonium persulfate into 220 gms of DI Water.

A second initiator solution (solution C) to be added later during polymerization was prepared by mixing 2.5 gms of ammonium persulfate with 60 gms of DI water.

A solution of reactor additives was made up as follows (Item D). To 60 gms of DI Water was added 2.8 gms of 50% aqueous sodium hydroxide and 137 gms of sodium dodecyl benzene sulfonate surfactant.

The reactor was charged with 700 gms of DI water. A nitrogen sweep of the reactor was begun while it was heated to 85 deg C., and maintained throughout the polymerization process. When the temperature equilibrated at 85 deg C., 20 gms of a latex polymer of 100 nm particle size and consisting of 45% non-volatile contents was added to the reactor. Immediately following this addition, all of solution B was added to the reactor. With a temperature of 82 deg C. in the reactor, the feed of Item A was begun at a rate of 10.5 gms/min. Within 5 minutes the temperature rose to 85 deg C. at which point cooling was applied to the reactor flask to maintain a constant (+/−1 deg C.) temperature of 85 deg C.

After 25% (736 gms) of Item A had been fed to the reactor (70 minutes of feed), the feed was stopped. At this point, all of Item D was added to the reactor. The feed of Item A was resumed at a rate of 13.0 gms/min. The temperature, which dropped to 80 deg C. with the addition of Item D, was allowed to rise back to 85 deg C. +/−1 deg C. and maintained there using cooling as needed. When the feed of Item A was resumed, a gradual feed of Solution C was also begun at a rate of 0.37 gms/min. When 76% of the total starting weight of Item A had been fed (2237 gms), the reactor contents were removed from the reactor, and transferred to a suitable receptacle. The rate of material removal from the reactor was kept the same as the rate of addition of the feeds to the reactor. That is, the level of material in the reactor was kept constant. Polymerization was continued in this manner until all of Item A had been fed to the reactor. At this point, the feed of solution C was also completed.

The reactor contents were held at a temperature of 85 deg C. for 15 minutes to allow the unreacted monomers to polymerize. At this point, additional initiators were added to further reduce unreacted monomers. Thus, 0.2 gms of 70% aqueous tert-butyl hydroperoxide and 0.08 gms of a 1.6% aqueous solution of sodium formaldehyde sulfoxylate were added to the reactor after cooling to 75 deg C. After standing about 10 minutes, the contents of the reactor and the overflow vessel which had been capturing the overflowed material were combined in a single agitated vessel. Another set of initiators was added to further reduce unreacted monomer. Thus, to the batch was added 0.8 gms of 70% aqueous tert-butyl hydroperoxide and 0.32 gms of an 8.0% aqueous solution of sodium formaldehyde sulfoxylate. After 15 minutes, 28 gms of a 28% aqueous solution of ammonia was added to the batch and allowed to mix in for 5 minutes. The batch was then cooled to room temperature, at which time 160 gms of DI Water was added for dilution.

The batch, at this point, was finished. The batch had a volume equal to 1.5 reactor volumes. The latex had a non-volatile content of 54.6%. The viscosity of the latex was 145 centipoise (Brookfield viscosity measured with spindle #3 at 60 RPM). The pH was 9.2. Particle size was measured using a Capillary Hydrodynamic Fraction unit (CHDF). Two major peaks were at 60 nanometers (nm)and 463 nm. The weight average contribution of the 60 nm material was 7.4% and the larger mode was 88.6%.

EXAMPLE 2

Using all of the same ingredients of Example 1, the following latex was prepared. The reactor was charged with 700 gms of DI water. A nitrogen sweep of the reactor was begun while it was heated to 85 deg C., and maintained throughout the polymerization process. When the temperature equilibrated at 85 deg C., 20 gms of a latex polymer of 100 nm particle size and consisting of 45% non-volatile contents was added to the reactor. Immediately following this addition, all of solution B was added to the reactor. With a temperature of 82 deg C. in the reactor, the feed of Item A was begun at a rate of 18.4 gms/min. Within 5 minutes the temperature rose to 85 deg C., at which point cooling was applied to the reactor flask to maintain a constant (+/−1 deg C.) temperature of 85 deg C.

After 25% (736 gms) of Item A had been fed to the reactor (40 minutes of feed), the feed was stopped. At this point, all of Item D was added to the reactor. The feed of Item A was resumed at a rate of 22.1 gms/min. The temperature, which dropped to 80 deg C. with the addition of Item D, was allowed to rise back to 85 deg C. +/−1 deg C. and maintained there using cooling as needed. When the feed of Item A was resumed, a gradual feed of Solution C was also begun at a rate of 0.625 gms/min. When 46% of the total starting weight of Item A had been fed (1354 gms), the reactor contents were removed from the reactor, and transferred to suitable receptacle. The rate of material removal from the reactor was kept the same as the rate of addition of the feeds to the reactor. That is, the level of material in the reactor was kept constant. Polymerization was continued in this manner until all of Item A had been fed to the reactor. At this point, the feed of solution C was also completed.

The reactor contents were held at a temperature of 85 deg C. for 15 minutes to allow the unreacted monomers to polymerize. At this point, additional initiators were added to further reduce unreacted monomers. Thus, 0.2 gms of 70% aqueous tert-butyl hydroperoxide and 0.08 gms of a 1.6% aqueous solution of sodium formaldehyde sulfoxylate were added to the reactor after cooling to 75 deg C. After standing about 10 minutes, the contents of the reactor and the overflow vessel which had been capturing the overflowed material were combined in a single agitated vessel. Another set of initiators was added to further reduce unreacted monomer. Thus, to the batch was added 0.8 gms of 70% aqueous tert-butyl hydroperoxide and 0.32 gms of an 8.0% aqueous solution of sodium formaldehyde sulfoxylate. After 15 minutes, 28 gms of a 28% aqueous solution of ammonia was added to the batch and allowed to mix in for 5 minutes. The batch was then cooled to room temperature, at which time 160 gms of DI Water was added for dilution.

The batch, at this point, was finished. The batch had a volume equal to 1.5 reactor volumes. The latex had a non-volatile content of 53.3%. The viscosity of the latex was 800 centipoise (Brookfield viscosity measured with spindle #3 at 60 RPM). The pH was 9.1. Particle size was measured using a Capillary Hydrodynamic Fraction unit (CHDF). Two major peaks were at 85 nanometers (nm) and 436 nm. The weight average contribution of the 85 nm material was 40% and the larger mode was 55.4%.

EXAMPLE 3

Using all of the same ingredients of Example 1, the following latex is prepared. The reactor is charged with 700 gms of DI water. A nitrogen sweep of the reactor is begun while it is heated to 85 deg C., and maintained throughout the polymerization process. When the temperature equilibrates at 85 deg C., 20 gms of a latex polymer of 100 nm particle size and consisting of 45% non-volatile contents is added to the reactor. Immediately following this addition, all of solution B is added to the reactor. With a temperature of 82 deg C. in the reactor, the feed of Item A is begun at a rate of 18.4 gms/min. Within 5 minutes the temperature rises to 85 deg C., at which point cooling is applied to the reactor flask to maintain a constant (+/−1 deg C.) temperature of 85 deg C.

After 25% (736 gms) of Item A has been fed to the reactor (40 minutes of feed), the feed is stopped. At this point, 199.8 gms of a 50 nm diameter polymer emulsion is added to the reactor. The feed of Item A is resumed at a rate of 22.1 gms/min. The temperature, which drops to 80 deg C. with the addition of Item D, is allowed to rise back to 85 deg C. +/−1 deg C. and maintained there using cooling as needed. When the feed of Item A is resumed, a gradual feed of Solution C is also begun at a rate of 0.625 gms/min. When 46% of the total starting weight of Item A has been fed (1354 gms), the reactor contents are removed from the reactor, and transferred to suitable receptacle. The rate of material removal from the reactor is kept the same as the rate of addition of the feeds to the reactor. That is, the level of material in the reactor is kept constant. Polymerization is continued in this manner until all of Item A has been fed to the reactor. At this point, the feed of solution C is also completed.

The reactor contents are held at a temperature of 85 deg C. for 15 minutes to allow the unreacted monomers to polymerize. At this point, additional initiators are added to further reduce unreacted monomers. Thus, 0.2 gms of 70% aqueous tert-butyl hydroperoxide and 0.08 gms of a 1.6% aqueous solution of sodium formaldehyde sulfoxylate are added to the reactor after cooling to 75 deg C. After standing about 10 minutes, the contents of the reactor and the overflow vessel which has been capturing the overflowed material are combined in a single agitated vessel. Another set of initiators is added to further reduce unreacted monomer. Thus, to the batch is added 0.8 gms of 70% aqueous tert-butyl hydroperoxide and 0.32 gms of an 8.0% aqueous solution of sodium formaldehyde sulfoxylate. After 15 minutes, 28 gms of a 28% aqueous solution of ammonia is added to the batch and allowed to mix in for 5 minutes. The batch is then cooled to room temperature where 160 gms of DI Water is added for dilution.

The batch, at this point, is finished. The batch has a volume equal to 1.5 reactor volumes.

What is claimed is:

1. A method of producing a bimodal polymer product, by semi-continuous, aqueous polymerization, comprising,
   (a) supplying to a single continuously stirred tank reactor, materials used in the polymerization, comprising water, and at least one ethylenically unsaturated monomer,
   (b) creating in said reactor, conditions causing polymerization of a first polymer mode to proceed,
   (c) adding a surfactant to initiate growth of a second polymer mode,
   (d) continuing said supply, under said conditions, producing a bimodal polymer product,
   (e) continuing said supply to said reactor, while simultaneously removing part of said bimodal polymer product from said reactor,
   (f) collecting said removed bimodal polymer product in at least one separate vessel, continuing said supply, and maintaining said conditions until the total supply is at least 1.05 reactor volumes and less than to 2 reactor volumes,
   (g) completing said polymerization reaction in said separate vessel(s),
   (h) combining together all of the bimodal polymer product.

2. The method, as recited in claim 1, wherein a catalyst is added to the combined product.

3. The method, as recited in claim 1, wherein said monomers comprise at least one monomer from the group butyl acrylate and methyl methacrylate.

4. The method, as recited in claim 1, in which in the initial supply, water is added to the reactor, followed by the separate addition of the monomers to be polymerized.

* * * * *